United States Patent
Saravanan

(10) Patent No.: US 10,735,413 B2
(45) Date of Patent: *Aug. 4, 2020

(54) SYSTEM AND METHOD FOR VERIFYING LIVELINESS

(71) Applicant: MorphoTrust USA, LLC, Billerica, MA (US)

(72) Inventor: Thiagarajan Saravanan, Billerica, MA (US)

(73) Assignee: MorphoTrust USA, LLC, Billerica, MA (US)

( * ) Notice: Subject to any disclaimer, the term of this patent is extended or adjusted under 35 U.S.C. 154(b) by 41 days.

This patent is subject to a terminal disclaimer.

(21) Appl. No.: 16/118,625

(22) Filed: Aug. 31, 2018

(65) Prior Publication Data

US 2019/0014110 A1    Jan. 10, 2019

Related U.S. Application Data

(63) Continuation of application No. 15/356,794, filed on Nov. 21, 2016, now Pat. No. 10,104,072, which is a continuation of application No. 14/619,886, filed on Feb. 11, 2015, now Pat. No. 10,129,251.

(60) Provisional application No. 61/938,347, filed on Feb. 11, 2014.

(51) Int. Cl.
| | |
|---|---|
| *H04L 29/06* | (2006.01) |
| *G06Q 50/26* | (2012.01) |
| *G06F 3/01* | (2006.01) |
| *G06K 9/00* | (2006.01) |
| *G06K 9/62* | (2006.01) |

(52) U.S. Cl.
CPC .......... *H04L 63/0861* (2013.01); *G06F 3/017* (2013.01); *G06K 9/00288* (2013.01); *G06K 9/6201* (2013.01); *G06Q 50/265* (2013.01); *H04L 63/0815* (2013.01)

(58) Field of Classification Search
CPC ............ H04L 63/0861; H04L 63/0815; G06Q 50/265; G06K 9/00288; G06K 9/6201; G06F 3/017
See application file for complete search history.

(56) References Cited

U.S. PATENT DOCUMENTS

| | | | |
|---|---|---|---|
| 5,841,886 | A | 11/1998 | Rhoads |
| 6,259,405 | B1 | 7/2001 | Stewart et al. |
| 6,414,635 | B1 | 7/2002 | Stewart et al. |
| 7,004,388 | B2 | 2/2006 | Kohta |
| 8,385,590 | B1 | 2/2013 | Moorer |
| 9,407,620 | B2 | 8/2016 | Miu |
| 9,426,328 | B2 | 8/2016 | Martin |
| 9,497,349 | B2 | 11/2016 | Martin |
| 9,501,882 | B2 | 11/2016 | Saravanan |

(Continued)

*Primary Examiner* — Tri M Tran
(74) *Attorney, Agent, or Firm* — Fish & Richardson P.C.

(57) ABSTRACT

A machine-assisted method for verifying a video presence that includes: receiving, at a computing device of an identity provider, an authentication request initially sent from a requester to access an account managed by a relying party, different from the identity provider; retrieving, from the authentication request, at least a portion of a video stream feed initially from the requester, to the computing device, the portion of video stream feed portraying a face of the requester; extracting the face of the requester from the portion of the video stream feed; providing a directive to the requester soliciting a corresponding gesture; and receiving a response gesture from the requester.

20 Claims, 14 Drawing Sheets

(56) References Cited

U.S. PATENT DOCUMENTS

| | | |
|---|---|---|
| 2001/0001239 A1 | 5/2001 | Stewart |
| 2002/0056043 A1 | 5/2002 | Glass |
| 2002/0073310 A1 | 6/2002 | Benantar |
| 2002/0118394 A1 | 8/2002 | McKinley et al. |
| 2002/0157005 A1 | 10/2002 | Brunk et al. |
| 2003/0023858 A1 | 1/2003 | Banerjee et al. |
| 2003/0085808 A1 | 5/2003 | Goldberg |
| 2003/0136828 A1 | 7/2003 | Takesada et al. |
| 2003/0138128 A1 | 7/2003 | Rhoads |
| 2003/0154406 A1 | 8/2003 | Honarvar et al. |
| 2004/0114779 A1 | 6/2004 | Blazey |
| 2004/0153649 A1 | 8/2004 | Rhoads et al. |
| 2004/0243806 A1 | 12/2004 | McKinley et al. |
| 2004/0248588 A1 | 12/2004 | Pell et al. |
| 2004/0258274 A1 | 12/2004 | Brundage et al. |
| 2005/0039022 A1 | 2/2005 | Venkatesan |
| 2005/0160271 A9 | 7/2005 | Brundage et al. |
| 2005/0240779 A1 | 10/2005 | Aull et al. |
| 2005/0243199 A1 | 11/2005 | Bohaker et al. |
| 2005/0246550 A1 | 11/2005 | Orbke et al. |
| 2005/0256724 A1 | 11/2005 | Rasin et al. |
| 2006/0206351 A1 | 9/2006 | Hodges et al. |
| 2006/0212931 A1 | 9/2006 | Shull et al. |
| 2007/0016790 A1 | 1/2007 | Brundage et al. |
| 2007/0083915 A1 | 4/2007 | Janakiraman et al. |
| 2007/0091376 A1 | 4/2007 | Calhoon et al. |
| 2009/0277961 A1 | 11/2009 | Mak |
| 2009/0307097 A1 | 12/2009 | De Faria |
| 2009/0307132 A1 | 12/2009 | Phillips |
| 2010/0170947 A1 | 7/2010 | Christofferson |
| 2010/0172539 A1 | 7/2010 | Sugimoto et al. |
| 2010/0228632 A1 | 9/2010 | Rodriguez |
| 2011/0077983 A1 | 3/2011 | Hua et al. |
| 2011/0167059 A1 | 7/2011 | Fallah |
| 2011/0275360 A1 | 11/2011 | Sample et al. |
| 2012/0078723 A1 | 3/2012 | Stewart |
| 2012/0163653 A1 | 6/2012 | Anan et al. |
| 2012/0198232 A1 | 8/2012 | Hannel et al. |
| 2012/0323614 A1 | 12/2012 | Lin |
| 2012/0330769 A1 | 12/2012 | Arceo |
| 2013/0167212 A1 | 6/2013 | Azar et al. |
| 2013/0218931 A1 | 8/2013 | Lewis |
| 2013/0223674 A1 | 8/2013 | Eckel et al. |
| 2013/0243266 A1 | 9/2013 | Lazzouni |
| 2013/0340052 A1 | 12/2013 | Jakobsson |
| 2014/0098284 A1 | 4/2014 | Oberpriller et al. |
| 2014/0337930 A1 | 11/2014 | Hoyos et al. |
| 2014/0372359 A1 | 12/2014 | Greborio et al. |
| 2015/0012307 A1 | 1/2015 | Moss |
| 2015/0063655 A1 | 3/2015 | Poder et al. |
| 2015/0063657 A1 | 3/2015 | Poder et al. |
| 2015/0067344 A1 | 3/2015 | Poder et al. |
| 2016/0127856 A1 | 5/2016 | Link, II |
| 2016/0157150 A1 | 6/2016 | Wirtanen et al. |
| 2016/0358298 A1 | 12/2016 | Martin |
| 2017/0006010 A1 | 1/2017 | Miu |
| 2017/0041759 A1 | 2/2017 | Gantert et al. |
| 2017/0053373 A1 | 2/2017 | Martin |
| 2017/0069151 A1 | 3/2017 | Saravanan |
| 2017/0118209 A1 | 4/2017 | Saravanan |

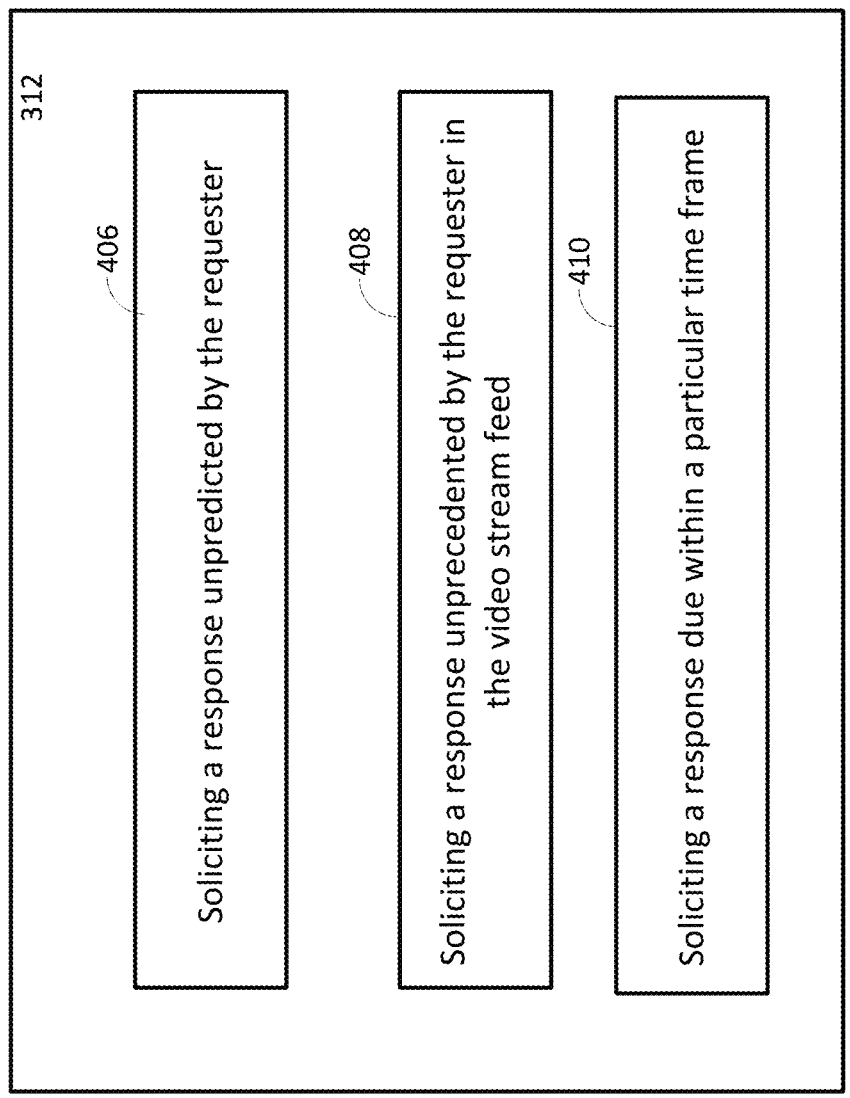

SYSTEM AND METHOD FOR VERIFYING LIVELINESS

CROSS-REFERENCE TO RELATED APPLICATIONS

This application is a continuation of U.S. patent application Ser. No. 15/356,794, filed Nov. 21, 2016, which is a continuation of U.S. patent application Ser. No. 14/619,886 filed Feb. 11, 2015 which claims priority to U.S. Provisional Application Ser. No. 61/938,347, filed on Feb. 11, 2014.

TECHNICAL FIELD

This document generally relates to the verification of on-line identities.

BACKGROUND

Transactions between a consumer and a merchant may be subject to risks of identity theft, identity fraud, spoofing, phishing, etc., all of which may potentially hinder the flow of commerce.

SUMMARY

In one aspect, some implementations provide a computer-implemented method. The method includes: receiving, at a computing device of an identity provider, an authentication request initially sent from a requester to access an account managed by a relying party, different from the identity provider; retrieving, from the authentication request, at least a portion of a video stream feed initially from the requester, to the computing device, the portion of video stream feed portraying a face of the requester; extracting the face of the requester from the portion of the video stream feed; providing a directive to the requester soliciting a corresponding gesture; and receiving a response gesture from the requester.

Implementations may include the following features. The method may further include: determining that the requester is not enrolled at the identity provider to be authenticated by the identity provider for accessing the account managed by the relying party. The method may additionally include: in response to determining that the response gesture matches the corresponding gesture being solicited, establishing a biometric identity for the requester at the identity provider by storing, at the identity provider, data encoding the extracted face of the requester. Establishing the biometric identity may further include: receiving the response gesture in the portion of the video stream feed.

Receiving the response gesture may additionally include: receiving the response gesture in the portion of the video stream feed at a refresh rate different than an earlier refresh rate of the portion of the video stream feed from which the face of the requested was extracted. Establishing the biometric identity may further include: querying the relying party for permission to establish the biometric identity of the requester at the identity party for the requester to access the account managed by the relying party. The method may additionally include: in response to obtaining the permission from the relying party, obtaining the biometric identity of the requester from the portion of the video stream feed. Establishing the biometric identity may additionally include: establishing the requester as owning the stored biometric identity provided that the face of the requester furnished by the requester in a later portion of a video stream feed matches the data encoding the extracted face of the requester stored at the identity provider. Establishing the biometric identity may additionally include: establishing the requester as authorized to access the account managed by the relying party provided that the later portion of the video stream feed is a portion of a live video stream from the requester.

The method may further include determining that the requester is enrolled at the identity provider to be authenticated by the identity provider for accessing the account managed by the relying party. The method may additionally include: determining that the face of the requester as extracted from the portion of the video stream feed matches a face of the requester as encoded in the data already stored at the identity provider. The method may further include: scoring the extracted face of the requester to determine a matching degree between (i) data encoding the face of the requester as extracted from the portion of the video feed and (ii) data, as stored at the identity provider, encoding the face of the enrolled requester. The method may further include: comparing the scored matching degree to a pre-determined threshold. The method may further include: determining that the received response gesture from the requester in the video stream feed matches the corresponding gesture being solicited. The method may additionally include: scoring the received response gesture from the requester in the video-stream feed to determine a match quality between the received response gesture and the corresponding gesture being solicited. The method may further include: comparing the scored match quality to a pre-determined threshold. The method may still include: in response to determining (i) that the received response gesture matches the corresponding gesture being solicited and (ii) that the face of the requester as extracted from the portion of the video stream feed matches the face of the requester as portrayed in the data already stored at the identity provider, determining that the requester is authorized to access the account.

The method may further include: directing the relying party to grant the requester access to the account. The method may additionally include: providing at least one additional directive to the requester soliciting at least one additional corresponding gesture in response. The method may additionally include: receiving at least one additional response gesture from the requester and in the portion of the video stream feed. The method may further include: determining that the received at least one additional response gesture from the requester in the video-stream feed matches the at least one additional corresponding gesture being solicited.

Providing the directive to the requester may include: providing the directive soliciting the response gesture unpredicted by the requester. Providing the directive to the requester may also include: providing the directive soliciting the response gesture unprecedented in earlier responses from the requester in the video stream feed. Providing the directive to the requester may additionally include: providing the directive soliciting the response gesture due within a particular time frame from the requester in the video stream feed.

Soliciting the corresponding response gesture may include: soliciting a proximity adjustment from the requester in the video stream feed. Soliciting the corresponding response gesture may additionally include: soliciting a motion of a specific body part of the requester in the video stream feed. Soliciting the corresponding response gesture may further include: soliciting a facial expression change from the requester in the video stream feed. Receiving the response gesture may further include: receiving the response gesture in the portion of the video stream feed at a refresh rate sufficient to encode a transition from an earlier gesture to the corresponding gesture being solicited.

In another aspect, some implementations provide a machine-assisted method, the method includes: receiving, from a user at a user-interface, an authentication request that the user is authorized to access an account managed by a relying party; encoding the user's face in a video stream feed such that the user's face is to be extracted from the video stream feed; embedding the video stream feed in the authentication request; sending the authentication request to a server at a relying party to which the authentication request is directed; and receiving, from a server at an identity provider, a request soliciting a corresponding gesture from the user; presenting, on the user device, the request soliciting the corresponding gesture to the user; receiving, from the user, a response gesture in response to the request; and embedding the response gesture in the video stream feed.

Implementations may include one or more of the following features. The method may include: receiving, from the server at the identity provider, determination results that the user has not enrolled at the identity provider to be authenticated by the identity provider for accessing the account managed by the relying party. The method may further include: transmitting the response gesture in the video stream feed at a refresh rate different than an earlier refresh rate of the video stream feed from which the face of the requester was to be extracted. The method may additionally include: transmitting the response gesture to establish a biometric identity of the user stored at the identity provider such that data encoding the user's face is stored at the identity provider.

The method may further include: receiving, from the server at the identity provider, determination results that the user has an established biometric identity at the identity provider to be authenticated by the identity provider for accessing the account managed by the relying party. The method may additionally include: receiving, from the server at the identity provider, determination results that the user's face, as encoded in the video stream feed, matches a face of the user as encoded in the established biometric identity stored at the identity provider. The method may further include: receiving, from the server at the identity provider, determination results that the user's face, as encoded in the video stream feed, matches a face of the user as encoded in the established biometric identity stored at the identity provider. The method may additionally include: receiving, from the server at the identity provider, determination results that the response gesture matches the corresponding response gesture being solicited by the identity provider.

Receiving the directive to the user may include: receiving the directive soliciting the response facial gesture unpredicted by the user. Receiving the directive to the user may also include: receiving the directive soliciting the response facial gesture unprecedented in earlier responses by the user. Receiving the directive to the user may include: receiving the directive soliciting the response facial gesture due within a particular time-out from the user in the video stream feed.

Soliciting the corresponding response facial gesture may include: soliciting a proximity adjustment from the user in the video stream feed. Soliciting the corresponding response facial gesture may include: soliciting a motion of a specific part of the face of the user in the video stream feed. Soliciting the corresponding response facial gesture may include: soliciting a facial expression change from the user in the video stream feed.

The method may additionally include: transmitting the video stream feed at a refresh rate sufficient to encode a transition from an earlier gesture to the corresponding gesture being solicited by the identity provider. The method may further include: receiving at least one additional directive to the user soliciting at least one additional corresponding gesture in response. The method may additionally include: receiving at least one additional response gesture from the user. The method may further include: embedding the at least one additional response facial gesture in the video stream feed to the server.

The system includes one or more processors and instructions embedded in a non-transitory machine-readable medium that are executable by the one or more processors. The instructions, when executed, are configured to cause the one or more processors to perform the above described actions. The default position is not to use any external databases, but the system could be configured to perform a database check if needed.

The details of one or more aspects of the subject matter described in this specification are set forth in the accompanying drawings and the description below. Other features, aspects, and advantages of the subject matter will become apparent from the description, the drawings, and the claims.

DESCRIPTION OF DRAWINGS

FIG. 4B is another flow chart illustrating the response gesture being solicited to verify a liveliness of the on-line biometric being presented according to some implementations.

Like reference symbols in the various drawings indicate like elements.

DETAILED DESCRIPTION

Proof of identity may present a perennial challenge in our daily transactions. With the advent of the Internet, comes the age of e-commerce in which on-line transactions may replace in-person transactions. However, the sheer volume and complexity of these on-line transactions may give rise to a digital world fraught with peril, including, for example, identity theft, identity fraud, spoofing, phishing, etc. Notably, such risks may not be new in the Internet age, although the Internet may have amplified such risks. As the society moves towards cloud computing, more and more databases may become accessible. Identity data in some databases may be more reliable and robust than others, based on history or tradition. As connectivity becomes ubiquitous and as more identity databases become available on accessible platforms, identity-related data housed therein can be accessed to increase the confidence in the quality of transactions conducted either online and in person. In addition, biometric data submitted on-line can be verified for liveness to deter spoofing attempts. In some implementations, the liveness verification can be conducted in an interactive manner to increase confidence in the biometric data being submitted on-line for authentication. Implementations disclosed herein may be extended to enterprise entities other than financial institutions.

Figure 1A:
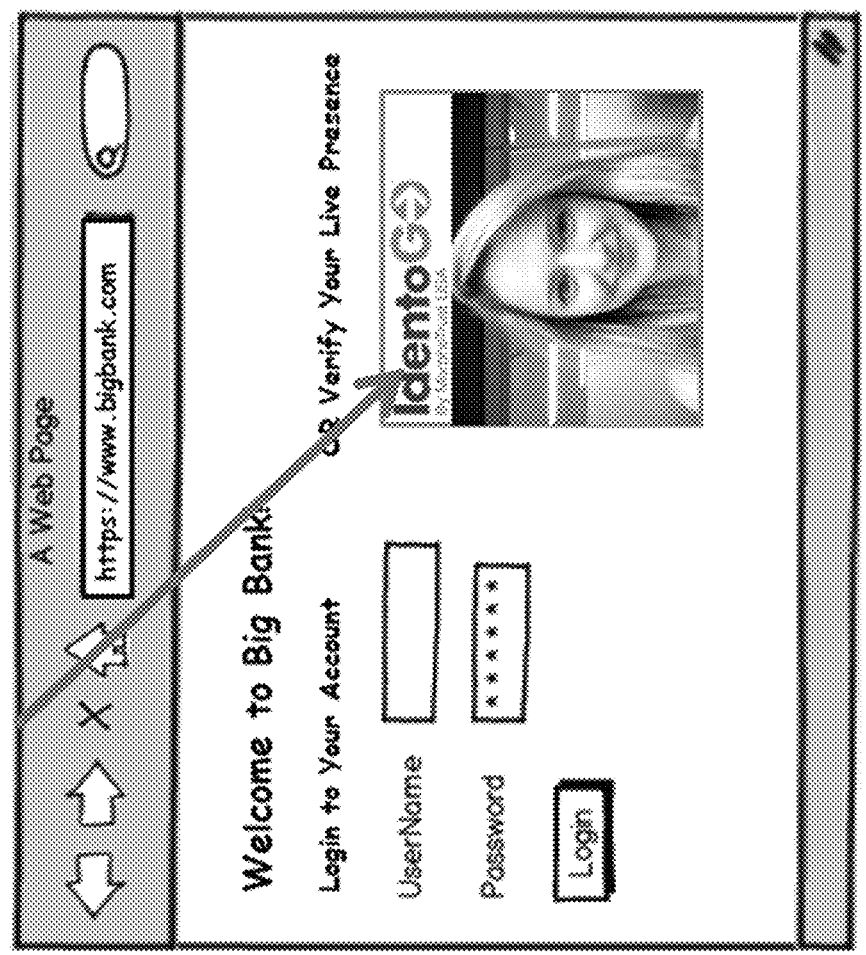
FIG. 1A is a diagram showing an example web site capable of authenticating a user based on a biometric identity of the user according to some implementations.

FIG. 1A is a diagram showing an example web site capable of authenticating a user based on a biometric identity of the user according to some implementations. As illustrated, a user name and password may be required for logging into an account administered by the server hosting the web-site. For example, the server may run an implementation of a hypertext transmission protocol secure (https). In the Internet age, a consumer user may have accounts at dozens of more web-sites, each with disparate requirements of user names and passwords. The consumer user may have a hard time keeping track of user names and passwords at each of the web-sites. Losing track of the registered username or password can hinder on-line access convenience. The consumer user may store the usernames and passwords for each account at a central file. But, access to the central file may be breached, leading to comprises in the stored usernames and passwords. In fact, simple on-line identities including user name and password may be subject to identity theft and identity fraud. A recent survey revealed that identity theft in the United States rose to a three-year high in 2012, with more than 5 percent of the adult population, or 12.6 million people, falling victim to such crimes. The numbers are up from 4.9 percent in 2011 and 4.35 percent in 2010. The incidence of identity theft is only expected to rise. To mitigate the risks arising from identity theft in the context of e-commerce, some implementations, as disclosed herein may choose to authenticate biometric data presented the user on-line. Such biometric data may include, but are not limited to, facial pattern, finger print, palm print, retina scan, iris scan, DNA pattern, voice characteristics, gait analysis. Generally speaking, such biometric data submitted on-line may be in a digital form to facilitate electronic verification. As illustrated by FIG. 1A, biometric login window 102 may be provided by a third-party, different from, for example, the entity that runs bigbank.com. The login window 102 may present the captured facial biometric of the user as the user attempts to log in based on the user's biometric. When the user's biometric data is transmitted for on-line authentication, the biometric data may be encrypted in accordance with industry standard including, for example, data encryption standard (DES), triple-DES, advanced encryption standard (AES), Rivest-Shamir-Adlema (RSA), open pretty good privacy (PGP), etc. In some implementations, the encryptions may be performed on a session-by-session basis in which the session encryption and decryption keys are constantly updated or refreshed to thwart attacks.

Figure 1B:
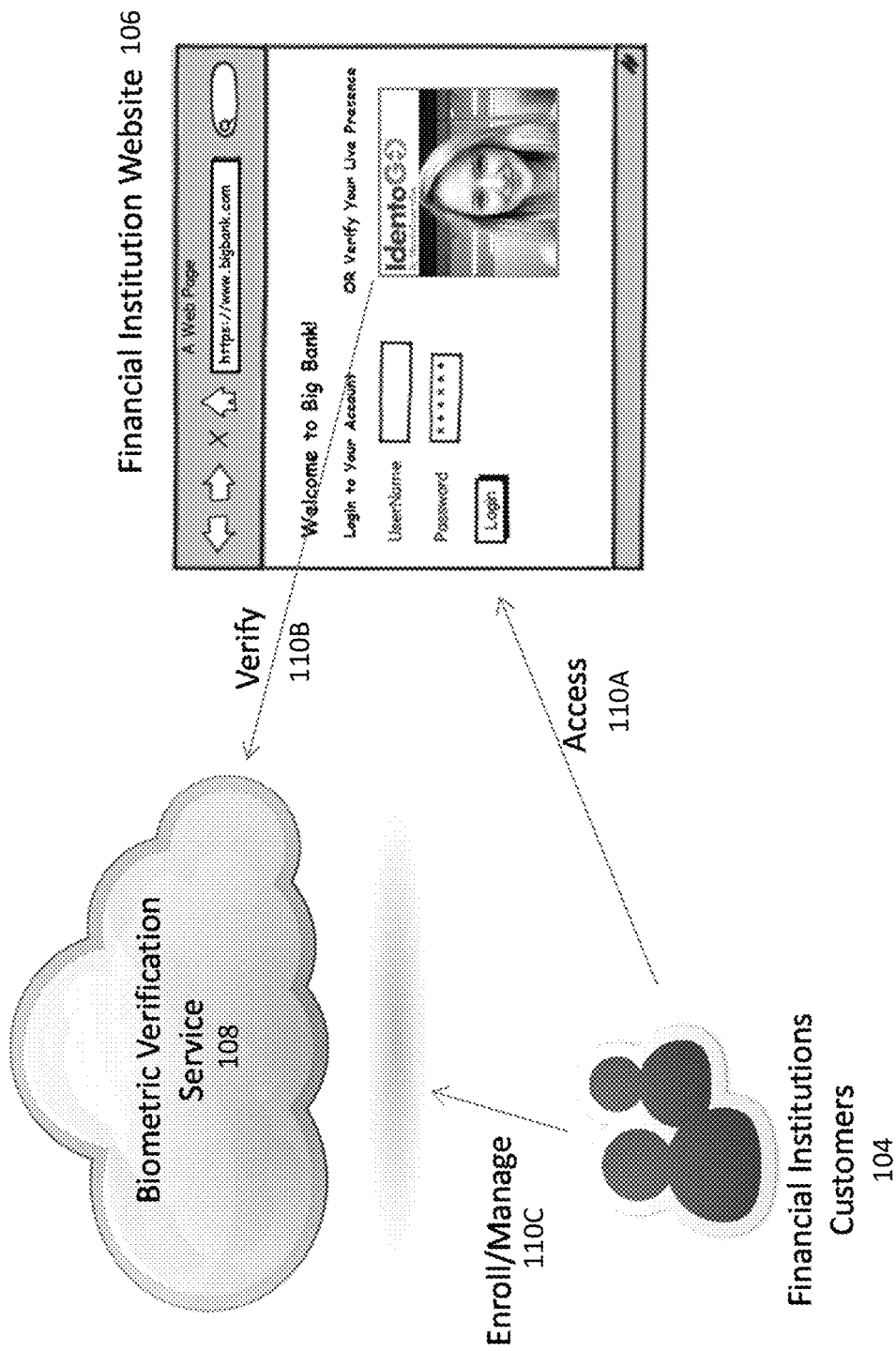
FIG. 1B is a diagram showing an example interaction among a financial institution customer, a financial institution, and a third-party biometric verification service to authenticate a user based on a biometric identity of the user according to some implementations.

At least two issues still remain. The first issue is regarding the vetting process in which a user may register a biometric of the user at a trusted server, for example, a third party server. The second issue is regarding the authentication process in which the liveliness of a biometric presented on-line can be verified to thwart spoofing attempts (for example, someone using a video or photo of the registered user to pretend to be the registered user), or man-in-the-middle attacks. To these ends, FIG. 1B is a diagram showing an example interaction among a financial institution customer, a financial institution, and a third-party biometric verification service to authenticate a user based on a biometric identity of the user according to some implementations. As disclosed herein, the financial institution may include a bank, and may also be known as the relying party. The third-party service provider may also be known as the identity provider.

When a financial institution customer 104 attempts to access an account through the financial institution website 106 (110A), customer 104 may be greeted with the biometric authentication window 102. The financial institution customer 104 may choose to use the biometric authentication. In response to receiving indication from customer 104 that the customer 104 would like to use the biometric authentication 102, the server running the financial institution web-site 106 may verify the user's authentication request using biometric data at biometric verification service 108 (110B). In some implementations, if customer 104 has never registered a biometric data at the biometric verification service 108, biometric verification service 108 may engage customer 104 to have the customer enrolled (110C). The enrollment process may generally include asking customer 104 to provide a biometric data as the biometric identity data stored/managed by biometric verification service 108. The enrollment process may become part of the vetting process in which biometric verification service further verifies the identity of the customer 104 at other authorities, including, for example, Department of Motor Vehicles (DMV) at the state level and the State Department at the federal level. The authorities may include a credit verification agency, such as, for example, Equifax, Experian, LexisNexis. The credit verification agency may serve as a surrogate of a government-administered authority. After the customer 104 obtains an enrolled biometric identity at the biometric verification service, customer 104 may interact with biometric verification service 108 to conduct routine management of the biometric identity (110C). Routine management may include, for example, replacement of a facial pattern, revocation of an existing facial pattern, etc. Hence, the first issue of a vetting process to register an enrolled biometric data of customer 104 may be addressed.

Regarding the second issue of the liveliness of the biometric data being presented on-line, the biometric login window 102 may interact with customer 104 to solicit response gestures that would be unique for each login session and would render spoofing attempts based on a replay of existing facial biometric hard, if not impossible, to prevail.

As discussed herein, a financial institution may be generalized as a relying party (RP) who may rely on a third party to authenticate that a customer is who the customer purports to be and that the customer is presenting a live facial biometric. The third party, known as the biometric verification service 108 in FIG. 1B, may be generalized as an identity provider (IdP).

Figure 2A:
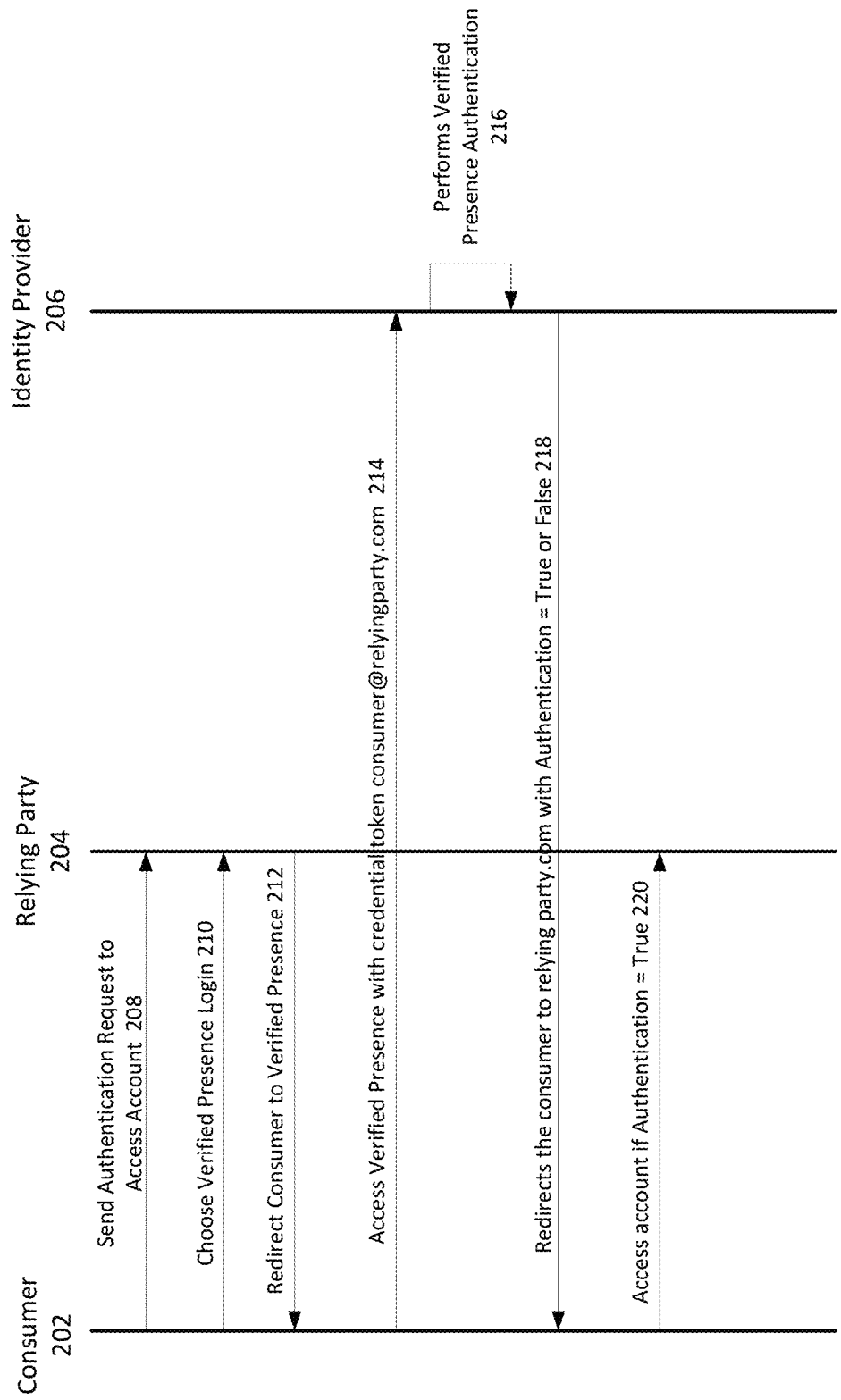
FIG. 2A is a timing diagram showing an example interaction among a consumer, a relying party, and an identity provider in authenticating the consumer when the consumer has enrolled at the identity provider according to some implementations.

With the above generalization, FIG. 2A is a timing diagram showing an example interaction among a consumer 202, a relying party (RP) 204, and an identity provider (IdP) 206 in authenticating the consumer when the consumer has enrolled at the identity provider 206 according to some implementations. The process may initiate with consumer 202 send an authentication request to access an account managed by relying party 204 (208). In some implementations, the submission of the authentication request may correspond to consumer 202 choosing biometric authentication 102 to access an account managed by, for example, a financial institution.

When the consumer submits the authentication request, the consumer may also choose a verified presence login for biometric authentication (210). The verified presence login, as disclosed herein, may address the liveliness of biometric data being submitted on-line.

For context, using a third-party intermediary to provide an authentication bridge way may be implemented in accordance with industry standards, for example, Security Assertion Markup Language (SAML) and Open standard for Authentication (OAuth).

SAML addresses web browser single sign-on (SSO). Single sign-on solutions may be implemented at the intranet level using, for example, cookies. Extending such single sign-on solutions beyond the intranet has been problematic and has led to the proliferation of non-interoperable proprietary technologies. In the use case addressed by SAML, the user (also known as the principal) may request a service from the relying party (also known as a service provider). The service provider then requests and obtains an identity assertion from the identity provider. On the basis of this identity assertion, the service provider can make an access control decision—deciding whether to perform some service for the connected principal.

In the case of Oauth (including more recent OAuth 2.0), the web application may specifically request a limited access OAuth Token (also known as the valet key) to access the Application Program Interfaces (APIs) on behalf of the user. The valet token may explicitly name the particular rights requested, and the user may not be required to enter a credential. If the user can grant that access, the web application can retrieve the unique identifier for establishing the profile (identity) using the APIs.

Hence, some standards may generally provide a single sign-on so that a consumer can use, for example, the consumer's Facebook or Google login credentials to access other accounts (for example, an amazon account, a linked-in account, etc.), typically of the same consumer. Some authentication methodologies as disclosed herein may provide a single authentication proof of identity by using biometric data, for example, using facial biometric.

Referring to FIG. 2A, in response to receiving the consumer choice of verified presence login, a server at the relying party may redirect consumer to proceed with verified presence (212). Thereafter, consumer 202 may be redirected to a server at the identity provider 206. For example, consumer 202 may submit a request to use verified presence by using a credential token in the form of consumer@relying_party.com (214). As illustrated in FIG. 2A, the request may be submitted at a server at identity provider 206.

Upon receiving the request to use verified presence, the server at identity provider 206 may perform verified presence authentication to verify the biometric submitted by the consumer (216). The verification may include that (i) the biometric submitted by the consumer provides affirmative proof of identity for the consumer; and (ii) the biometric submitted by the consumer on-line is fresh and live and not is being forged, for example, in a spoofing attempt.

As an initial matter, the server at identity provider 206 may retrieve, for example, a facial biometric from the data submitted by consumer 202. The retrieved facial biometric may be sent, from a computing device of consumer 202 to the server at identity provider 206, in an encrypted format based on an encryption algorithm.

The server at identity provider 206 may then compare the retrieved facial biometric with biometric identity data of consumer 202. The biometric identity data of consumer 202 may be pre-stored at the server at identity provider 206. The comparison may be conducted in a manner consistent with the context-dependent rigidity requirement of the authentication. For example, if the amount in transaction is less than a particular threshold, such as $50, then the degree of matching between the facial biometric as submitted by consumer 202 on-line and the pre-stored facial biometric at the server at the identity provider 206 may be reduced. On the other hand, however, the if amount in transaction is higher than a particular threshold, such as, for example, $1,000, then the degree of matching between the facial biometric as submitted by consumer 202 on-line and the pre-stored facial biometric at the server at the identity provider 205 may be heightened. In a related example, if the transaction is in the nature of a mortgage application, a credit card application, the degree of matching may also be heightened. A scoring mechanism may be implemented to generate a score to quantify the degree of resemblance between the facial biometric as submitted by consumer 202 on-line and the pre-stored facial biometric at the server of identity provider 206. The score of resemblance may be used by the server at identity provider 206 to determine whether the retrieved facial biometric as submitted by consumer 202 on-line is sufficient to prove that the submitting consumer 202 is the person whose biometric data is stored at the server of identity provider 206.

Further, the server at identity provider 206 may determine whether the retrieved facial biometric being submitted by consumer 202 on-line is a live facial biometric. One risk associated with on-line authentication has been the prospect of a man-in-the-middle attack. For example, during spoofing, a third party may impersonate consumer 202 by replaying an authentication proof as submitted by consumer 202 earlier and was obtained by the third party. Some encryption mechanism may counter the man-in-the-middle threat by refreshing or updating the encryption key used to encrypt the stream of communication sessions between consumer 202 and identity provider 206. Generally, however, such encryption mechanism may not address the staleness of the biometric data itself. In other words, some encryption mechanism may be inadequate if a third party obtains an instance of the biometric data and attempts to replay the instance of biometric data to gain access to the account of consumer 202. Such risks may be amplified with the combination of username and password login because the text strings for username and password may not be refreshed at the granularity of each login session. Specifically, refreshing username and password for each login session (or at a sub-session level at, for example, every few seconds) may not be practical.

Some implementations as disclosed herein may verify the liveliness of the biometric data as submitted by consumer 202. For example, the server at identity provider 206 may provide a directive to consumer 202 to solicit a gesture change from consumer 202. The directive may be provided as a visual directive. For example, the server at identity provider 206 may cause flashes to be displayed, for example, on the biometric login window 102 on the computing device of consumer 202. A flash on the upper right corner may signal consumer 202 to shift eye-stare towards the upper right corner accordingly. A motion across the biometric login window may signal consumer 202 to follow the same motion across the biometric login window with a corresponding eye-ball motion. The motion may include straight lines, curves, or even zig-zag motions. The visual direct may also be provided in a text prompt, requesting consumer 202 to make a particular gesture. The gesture may generally include a facial gesture, a body gesture, etc. The directive may also be provided as an audio directive. For example, the server at identity provider 206 may announce to consumer 202 to raise left hand to the left ear position. In providing the directives, the server at identity provider 206 may factor in existing knowledge about consumer 202, including, for example, whether consumer 202 is handicapped to prevent consumer 202 from raising a hand, performing an eye motion, or making a facial gesture, etc.

When consumer 202 performs a response gesture, the response gesture may be captured by a video camera on the user device of consumer 202. The captured response gesture may be digitized and transmitted back to the server at identity provider 206. Initially, the response gesture may be captured in a video stream at a full frame rate (for example, as determined by Nation Television System Committee—NTSC, or as determined by the video communication standard H.261). In some implementations, for efficiency of communication, only a portion of the captured video stream may be transmitted, for example, in accordance with adaptive video codec specification of H.261. When consumer 202 transitions to the response gesture, the motion may be digitalized and transmitted to the server at identity provider at a rate faster than a floor-level rate (when consumer 202 remains stationary). In fact, the transmitted motion may be analyzed by the server at identity provider 206 to determine whether the response gesture of consumer 202 matches the expected gesture being solicited.

Similar to facial authentication, a scoring mechanism may be implemented to quantify the degree of match between the response gesture being received at the server of the identity provider 206 and the expected gesture being solicited. The degree of match may depend on the context and hence can vary from application to application. For example, the degree of match may depend on the nature of the underlying transaction or the dollar amount involved in the underlying transaction.

In some implementations, the server at identity provider 206 may provide more than one directives and may expect more than one response gestures to determine the liveliness of a particular biometric being presented on-line. In one example implementation, identity provider 206 may request the consumer 202 to provide a second gesture response after the first gesture response from consumer 202 has been verified as in agreement with the corresponding expected gesture. The additional verifications may increase a confidence level that consumer 202 is indeed alive and is the person whose biometric is stored at the server of identity provider 206. By way of illustration, the first response gesture from consumer 202 may be less than a perfect match with the corresponding expected gesture. The match may be imperfect as a result of consumer 202 not responding to the directive to the fullest extent. Even though the directive is for consumer 202 to raise the left hand to touch the left eye brow, consumer 202 may have raised the left hand and touched as far as the left ear. The imperfect match could also be sampling error in that the video frame in which consumer 202 touched his left eye-brow with the left hand may be dropped and a nearby video frame was transmitted to the server at identity provider 206. Sometimes, the dollar amount associated with the underlying request may be significant and the server at identity provider 206 would rather err on the side of caution. Multiple directives may solicit more than one response gestures to buttress the confidence that consumer 202 is alive.

Some implementations may additionally include a biometric recognition feature to authenticate consumer 202. By way of example, server at identity provider 206 may conduct a facial recognition to compare the facial biometric of an enrolled consumer with the facial biometric of consumer 202 submitting the authentication request. If the comparison yields a matching result, the facial recognition may prove that consumer 202 is the person whose facial biometric is stored at the server at identity provider 206. In other examples, the biometric recognition may include voice recognition, speaker recognition, gait analysis, etc.

After verifying that consumer 202 is alive and is the person whose biometric has been stored at identity provider, server at identity provider 206 may provide a signal that authentication is successful. If, however, consumer 202 cannot be verified as alive or as the person whose biometric has been stored at identity provider 206 in association with the account at relying party 204, server at identity provider 206 may provide a signal that authentication has failed. The signal may be embedded in a message to consumer 202 to redirect consumer 202 back to relying party 204 (218).

Consumer 202 may then return to the relying party 204 (220). If the embedded signal indicates that the verification is successful, consumer 202 may proceed to access the account at relying party 204. In returning to relying party 204, consumer 202 may attach a success signal backed up by a credential of identity provider 206. The credential of the identity provider 206 may include, for example, a digital private key of identity provider 206, a digital watermark of identity provider 206. If, however, the embedded signal indicates that the verification has failed, consumer 202 may not access the account at relying party 204. Moreover, consumer 202 may not even be redirected back to the relying party 204.

Figure 2B:
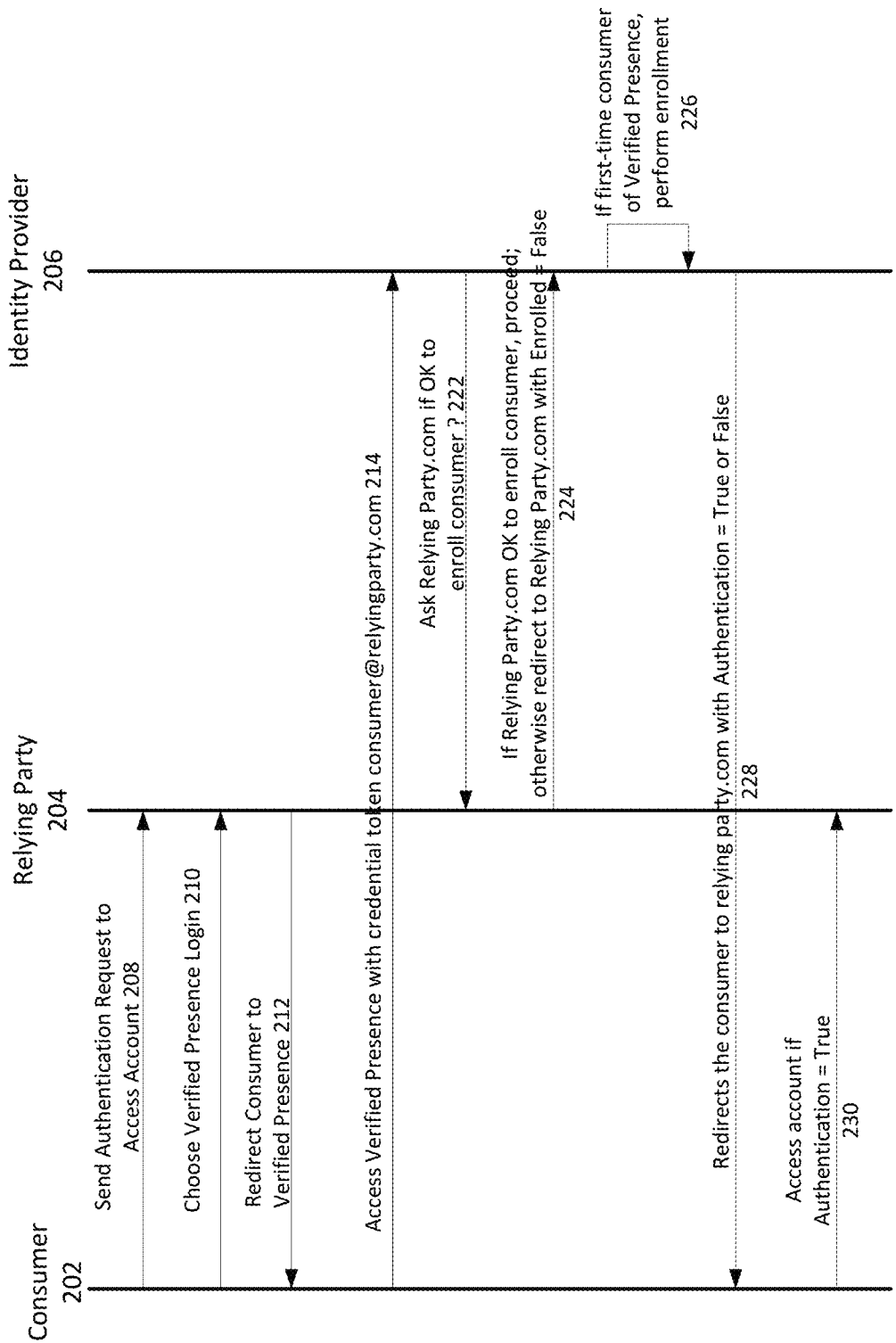
FIG. 2B is a timing diagram showing an example interaction among a consumer, a relying party, and an identity provider in authenticating the consumer when the consumer has not yet enrolled at the identity provider according to some implementations.

FIG. 2B is a timing diagram showing an example interaction among a consumer, a relying party, and an identity provider in authenticating the consumer when the consumer has not yet enrolled at the identity provider according to some implementations. As discussed above in association with FIG. 2A, the process may initiate with consumer 202 send an authentication request to access an account managed by relying party 204 (208). In some implementations, the submission of the authentication request may correspond to consumer 202 choosing biometric authentication 102 to access an account managed by, for example, a financial institution. When the consumer submits the authentication request, the consumer may also choose to a verified presence login for biometric authentication (210). In response to receiving the consumer choice of verified presence login, a server at the relying party may redirect consumer to proceed with verified presence (212). Thereafter, consumer 202 may be redirected to a server at the identity provider 206. For example, consumer 202 may submit a request to use verified presence by using a credential token in the form of consumer@relying_party.com (214). As illustrated in FIG. 2B, the request may be submitted at a server at identity provider 206.

The server at identity provider 206 may notice that consumer 202 has not yet registered for the verified presence service at identity provider 206. In response, the server at identity provider 206 may inquire the server at the relying party 204 whether the identity provider 206 may enroll consumer 202 in the verified presence service, as requested by consumer 202. Some relying parties may financially compensate identity provider 206 for the verified presence. In turn, these relying parties may stratify consumers into various classes with corresponding account benefits. By way of illustration, consumers with holdings above a threshold value of, for example, $50 k may have the verified presence service as a complimentary service. Consumers with less account value or shorter membership history may need to pay a fee to relying party 204 in order to have the verified presence service.

Upon determination that consumer 202 may enroll in the verified presence service, server at relying party 204 may indicate to the server at identity provider 206 that the enrollment for consumer 202 may proceed (224). If, however, server at relying party 204 determines that consumer 202 may not enroll in the verified presence service, server at relying party 204 may inform the server at identity provider 206 that consumer 202 does not have permission to enroll in the requested service and the server at identity provider 206 may drop the enrollment request initiated from consumer 202. Particularly, server at identity provider 206 may direct consumer 202 back to relying party 204 with the flag that enrollment has failed (224).

If the server at identity provider 206 receives confirmation that identity provider 206 may proceed with enrolling consumer 202, server at identity provider 206 may administer an enrollment procedure for consumer 202 (226). Specifically, identity provider 206 may request consumer 202 to register a biometric. The biometric may include, for example, a facial biometric, a finger-print, a palm-print, an iris scan, a retina scan. In the case of a facial biometric, server at identity provider 206 may request consumer 202 to pose in front of, for example, a web camera, a video camera, or a smart-phone camera. The camera device may reside on, for example, a computing device of consumer 202. The computing device may initially transmit a capture frame to server at identity provider 206. This captured frame may be stored at identity provider 206 as biometric information identifying consumer 202. To counter man-in-the-middle attacks, server at identity provider 206 may then request consumer 202 to make gestures in front of the camera device as directed. By way of example, server at identity provider 206 may send directives, verbally, textually, or graphically, to signal consumer 202 to make a response gesture. As an illustration, the directives may be presented to consumer 202 in a synthesized voice, a text prompt, or a graphic icon.

Consistent with the disclosure herein, server at identity provider 206 may also send multiple directives to consumer 202 to increase the confidence level that a live consumer is attempting to enroll in the service. As discussed herein, multiple directives for different and separate response gestures may obviate the ambiguities associated with a single response gesture. For example, when consumer 202 may not be responding to the fullest extent as requested, or when sampling error during video transmission may have missed the frame that contains the exact response gesture, a single response gesture may be insufficient to determine with confidence that consumer 202 is a live person attempting to enroll in the service.

When consumer 202 has been determined as a live person and has been enrolled in the verified presence service, the server at identity provider 206 may redirect consumer 202 back to relying party 204 with a signal that the authentication is successful (228). If consumer 202 has been successfully enrolled in the program, the server at identity provider 206 may provide a signal that the authentication has succeeded. If, however, consumer 202 cannot be verified as alive or as the person and cannot be enrolled in the verified service program, the server at identity provider 206 may provide a signal that authentication has failed. The signal may be embedded in a message to consumer 202 to redirect consumer 202 back to relying party 204 (218).

Consumer 202 may then return to the relying party 204 (230). If the embedded signal indicates that the authentication has succeeded, consumer 202 may proceed to access the account at relying party 204. In returning to relying party 204, consumer 202 may attach a success signal backed up by a credential of identity provider 206. The credential of the identity provider 206 may include, for example, a digital private key of identity provider 206, a digital watermark of identity provider 206. If, however, the embedded signal indicates that the authentication has failed, consumer 202 may not access the account at relying party 204. Moreover, consumer 202 may not even be redirected back to the relying party 204.

Notably, in some implementations, a first-time enrollee may be sent to the server at identity party 206 after the first-time enrollee has successfully logged into an account of the first-time enrollee at the relying party 204. The enrollment may provide consumers with additional security features to guard against spoofing attacks. The security features may also include biometric recognition, as detailed above. In fact, some configurations may use the biometric recognition as a form of password authentication. In other words, the biometric recognition may be used as a surrogate for the password login.

In some implementations, however, identity provider 206 may obtain a database for a number of consumers attempting to enroll in a verified presence program. During the enrollment process, the server at identity provider 206 may collect a biometric from a consumer attempting to enroll. After verifying that the consumer is a live person making a legitimate enrollment request, the server at identity provider 206 may enroll the consumer. Hence, in some implementations, the server at identity provider 206 may have a copy of a digital biometric of consumer 202 when consumer 202 has been redirected from relying party 204. When a copy of the digital biometric of consumer 202 is available, the server at identity provider 206 may only need to determine that consumer 202 is a live person.

Figure 3A:
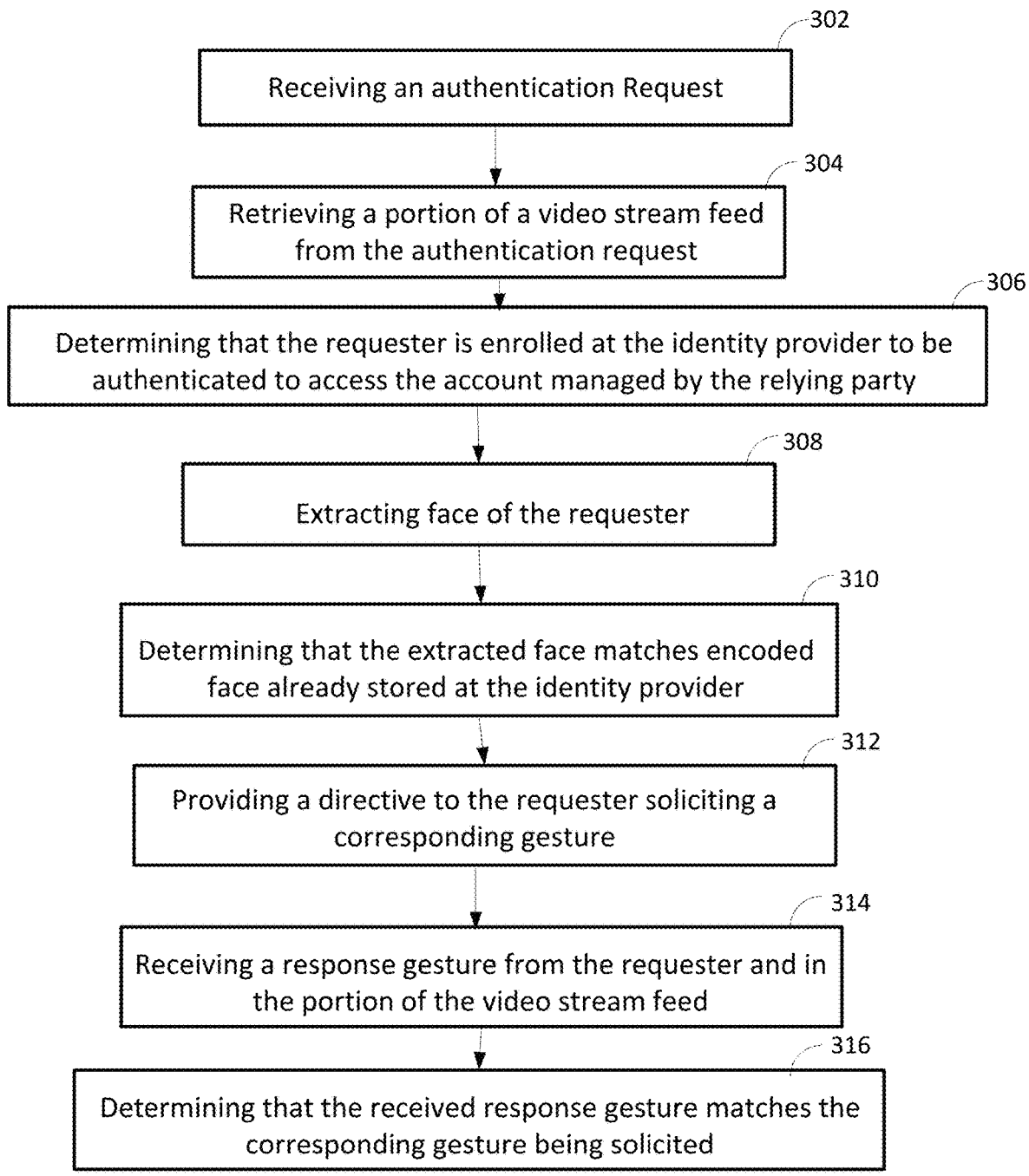
FIG. 3A is a flow chart showing an example method at a server of an identity provider to authenticate a user according to some implementations.

FIG. 3A is a flow chart showing an example method at a server of an identity provider 206 to authenticate a user according to some implementations. The server at identity provider 206 may be implemented as a cloud service, accessible anywhere from the Internet. Software, platforms, and infrastructure may be provided as a service remotely through the Internet to, for example, relying party 204. For fast access and efficient communication, the server at identity provider 206 also may be implemented as an appliance to be hosted on an intranet at relying party 204. The implementation also may be known as a private cloud. The appliance may include a server software as well as dedicated hardware package for the verification purpose. By way of illustration, an appliance on the intranet at relying party 204 may include a rack-mount server box on the same network switch as an authentication server of relying party 204.

The server at identity provider 206 may receive an authentication request from relying party 204 (302). The authentication request may be sent from a server at relying party 204 when, for example, consumer 202 has attempting to obtain access to an account. The account may include, for example, a bank account, a credit card account, a mortgage account, a flexible spending account, a social security account, a Medicare account, a Medicaid account. By way of illustration, when consumer 202 has provided a valid user name in order to obtain account access, the server at relying party 204 may submit an authentication request to the server at identity provider 206. The authentication request may prompt the server at identity provider 206 to verify that consumer 202 attempting to access the account is a live person. As discussed herein, the server at identity provider 206 may additionally determine that consumer 202 attempting to access the account has a biometric matching a digital biometric of the account owner or authorized user.

By way of illustration, the server at identity provider 206 may retrieve at least a portion, for example, a video frame, of a video stream feed (304). The video stream feed may accompany the authentication request. The video stream feed may be relayed from relying party 204, for example, a bank. The video stream feed may originate from a video camera on a computing device of consumer 202. As discussed herein, a variety of video transmission techniques may be employed. Some video transmission techniques may transmit at reduced frame rate (compared to the frame rate at video capture). Some video transmission techniques may transmit selected frames when objects in the video stream exhibits motions. The reduced rate transmission or selected frame transmission may reduce communication bandwidth usage on the communication link between the server of identity provider 206 and the server of identity provider 204.

Next, the server at identity provider 206 may determine that the requester is enrolled at the identity provider 206 to be authenticated, via the verified presence program, to access the account managed by the relying party 204 (306). As noted above, enrollment may be optional. By way of illustration, depending on the subscription plan of a consumer, the consumer may have complimentary access to the verified presence program. The consumer may need to pay a monthly fee, or per-use fee, to use the verified presence program. Hence, as an initial matter, the server at identity provider 206 may determine whether the requester is enrolled for the verified presence service.

If the enrollment status of consumer 202 has been confirmed, the server at identity provider 206 may extract a face of the requesting consumer from the video stream relayed from relying party 204 (308). The extraction may include segmentation and edge detection techniques. The extraction may also include edge enhancement to sharpen, for example, hair regions.

Thereafter, the server at identity provider 206 may determine that the extracted facial biometric matches the facial biometric of the account owner or authorized user (310). The data encoding the facial biometric of the account owner or authorized user may already be stored at the server at identity provider 206. The determination may generally include facial recognition or pattern recognition techniques to handle, for example, deformational, translational, or rotational changes in shape.

The server at identity provider 206 may provide a directive to the requester soliciting a corresponding gesture (312). The directive may be in verbal, textual, or graphical format, as discussed above. The directive may ask consumer 202 to react with a particular response gesture, for example, shaking head, touching nose, or raise a hand. Referring to FIG. 4B, the directive may solicit a response gesture unpredicted by the requesting user (406). The directive may solicit a response gesture not experienced by the requesting user (408). The directive may also solicit a response gesture to be returned by the requesting user within a particular time frame (410).

Returning to FIG. 3A, in response to the directive, consumer 203 may react with a response gesture. The response gesture may be captured by a camera device on a computing device of consumer 202, as discussed above. Data encoding the response gesture may then be received at the server at identity provider 206 (314). As noted above, the data encoding the response gesture may be in a portion of the video stream feed originating from the camera device on the computing device of consumer 202.

Figure 4A:
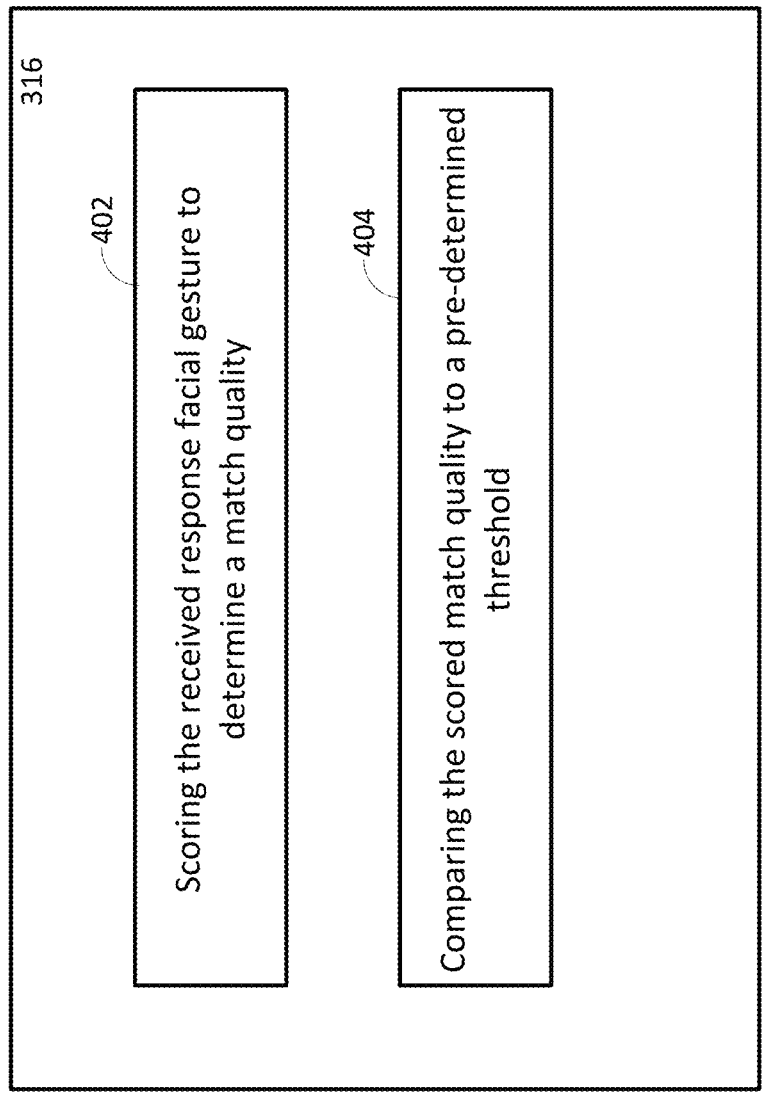
FIG. 4A is a flow chart illustrating a scoring method to verify a liveliness of the on-line biometric being presented according to some implementations.
Figure 4C:
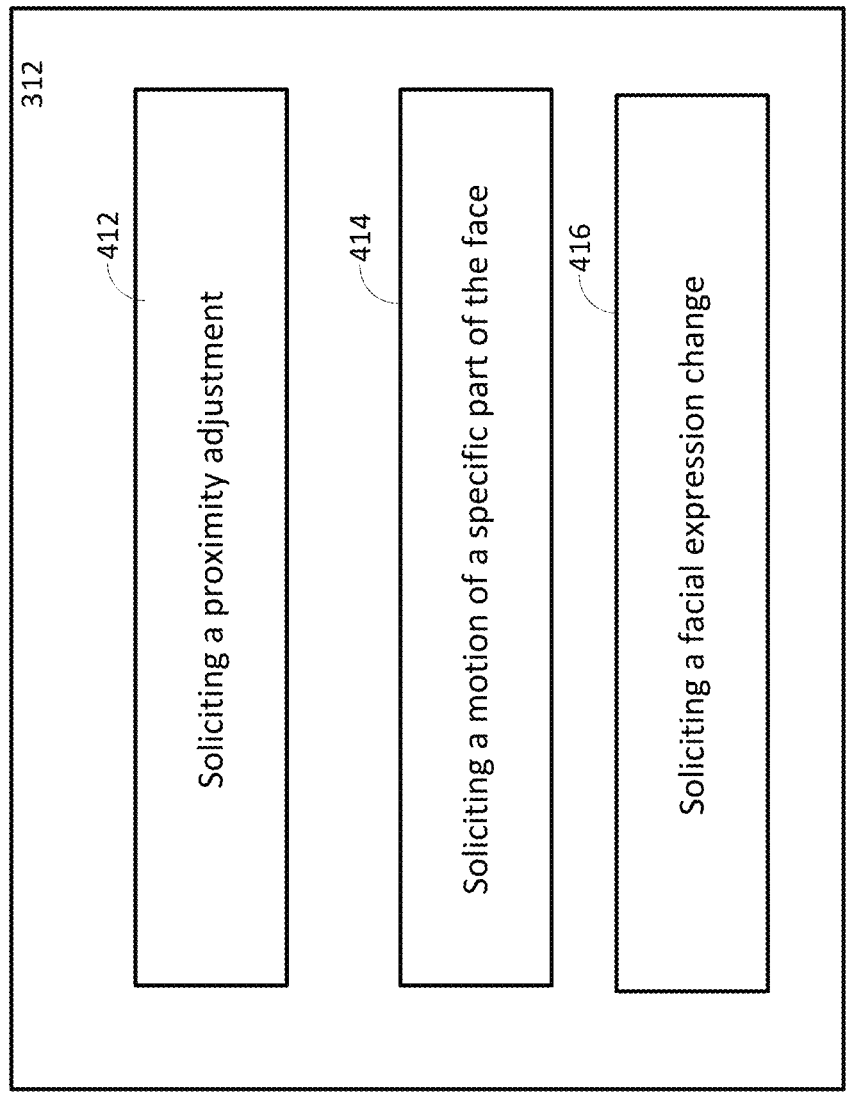
FIG. 4C is yet another flow chart illustrating the response gesture being solicited to verify a liveliness of the on-line biometric being presented according to some implementations.

Thereafter, server at identity provider 206 may apply video processing to determine that the received response gesture matches the corresponding gesture being solicited (316). As illustrated by FIG. 4A, the received response gesture may be scored to determine a match quality (402). The score may quantify a degree of similarity between the response gesture received and the expected gesture. The numerical score may be compared to a pre-determined threshold (404).

Returning to FIG. 3A, the directives may be provided in series to further improve the confidence that consumer 202 making the request is a live person. As disclosed herein, in performing the response gesture, consumer 202 may not have reached the full extent for performing the response gesture. Data transmitted may have missed the exact frame for a perfect match. As a result, the matching may be less than 100%. For certain transaction requests, a less than perfect match may be good enough. For other transaction requests, to further improve the confidence that consumer 202 making the request is a legitimate user and not a spoofing attack, additional directives may be sent and more response gestures may be received. As illustrated in FIG. 3C, an additional directive may be provided to the requesting user soliciting an additional corresponding gesture (324). In response, an additional response gesture may be received and server at identity provider 206 may determine whether the additional response gesture matches the additional corresponding gesture being solicited (326). The additional verification may add confidence that the request is legitimate. For example, multiple imperfect matches may point to a request more likely legitimate. One of the multiple verification may have yielded a perfect match and the perfect match may improve the confidence that consumer 202 is a live person attempting to access an account.

The techniques described above are not limited to facial biometrics only. In fact, the techniques disclosed herein may generally apply to other forms of biometrics including, for example, voice, finger-print, palm-print, iris-scan, pupil-scan, skin texture, or retina-scan.

Figure 3B:
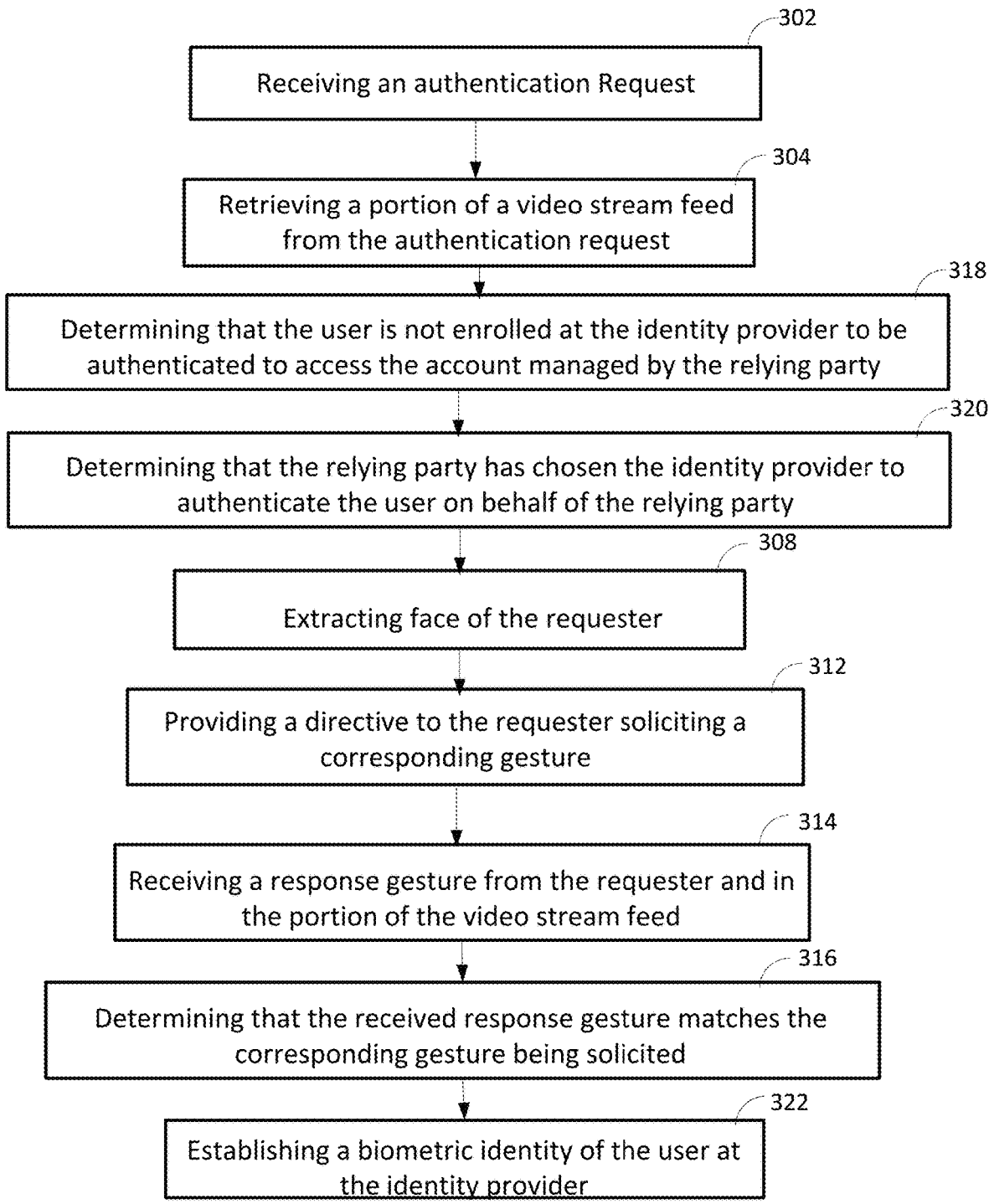
FIG. 3B is a flow chart showing another example method at a server of an identity provider to authenticate a user according to some implementations.
Figure 3C:
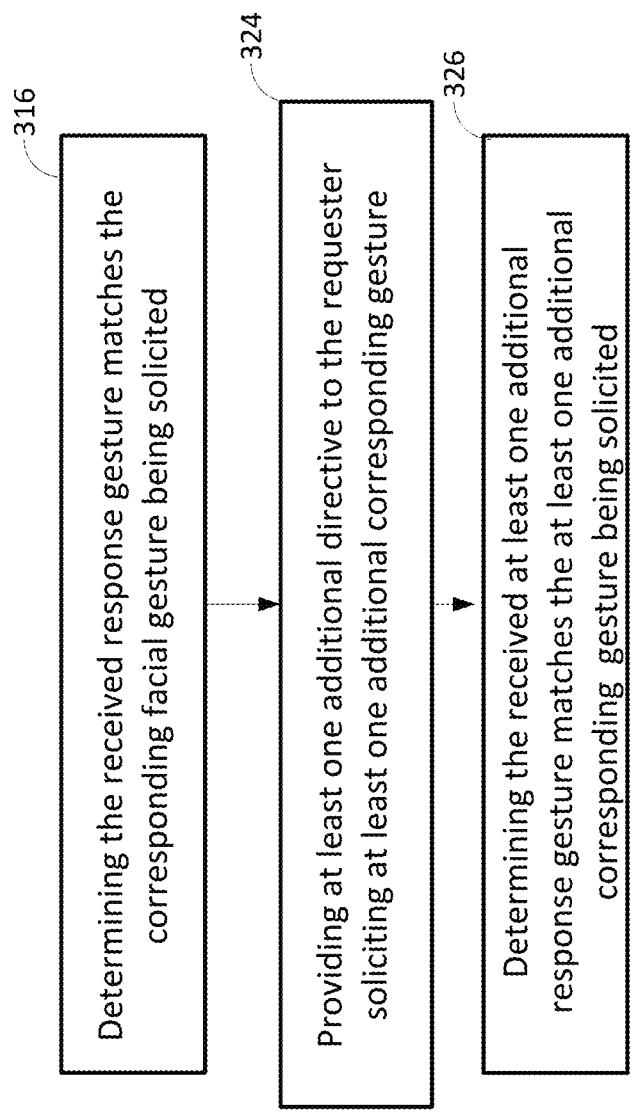
FIG. 3C is a flow chart showing an example method at a server of an identity provider to further verify the liveliness of an on-line biometric being presented according to some implementations.

Turning to FIG. 3B, showing a flow chart showing another example method, the server at identity provider 206 may receive an authentication request from relying party 204 (302). This method may be implemented at a server of an identity provider to authenticate a user. By way of illustration, the server at identity provider 206 may retrieve at least a portion, for example, a video frame, of a video stream feed (304).

Next, the server at identity provider 206 may determine that the requester is not yet enrolled at the identity provider 206 to be authenticated, via the verified presence program, to access the account managed by the relying party 204 (318). The determination may be reached when, for example, consumer 202 has never before used the verified presence service provided by server at identity provider 206.

Thereafter, the server at identity provider 206 may determine that the relying party 204 has chosen the identity provider 206 to authenticate that the requesting user on behalf of the relying party 204 (320). By way of illustration, relying party 204 may opt to participate in the services provided by the identity provider 206. In one example configuration, relying party 204 may pay a fee for the services provided by the identity provider 206.

In response to determining that the relying party 204 has chosen the identity provider 206 to authenticate that the requesting user on behalf of the relying party, the server at relying party 204 may enroll the requesting user. The server at identity provider 206 may extract a face of the requesting consumer from the video stream relayed from relying party 204 (308). As disclosed herein, the extraction may include segmentation and edge detection techniques. The extraction may also include edge enhancement to sharpen, for example, hair regions.

The server at identity provider 206 may provide a directive to the requester soliciting a corresponding gesture (312). The directive may be in verbal, textual, or graphical format, as discussed above. The directives may solicit response gestures as illustrated by examples in FIG. 4B.

Returning to FIG. 3B, in response to the directive, consumer 203 may react with a response gesture. The response gesture may be captured by a camera device on a computing device of consumer 202, as discussed above. Data encoding the response gesture may then be received at the server at identity provider 206 (314). As noted above, the data encoding the response gesture may be in a portion of the video stream feed originating from the camera device on the computing device of consumer 202.

Thereafter, server at identity provider 206 may apply video processing to determine that the received response gesture matches the corresponding gesture being solicited (316). The directives may be provided in series to further improve the confidence that consumer 202 making the request is a live person. As illustrated in FIG. 3C, additional directives may be sent soliciting additional gestures. The additional verification may add confidence that the request is legitimate.

In response to determining that the requesting user is a legitimate user making the enrollment request, a biometric of the user may be established at the server of the identity provider 206 (322). As disclosed herein, the biometric may generally include, for example, a facial portrait, a voice signature, a gait characteristic, a finger-print, a palm-print, an iris-scan, a pupil-scan, or a retina scan.

Figure 5A:
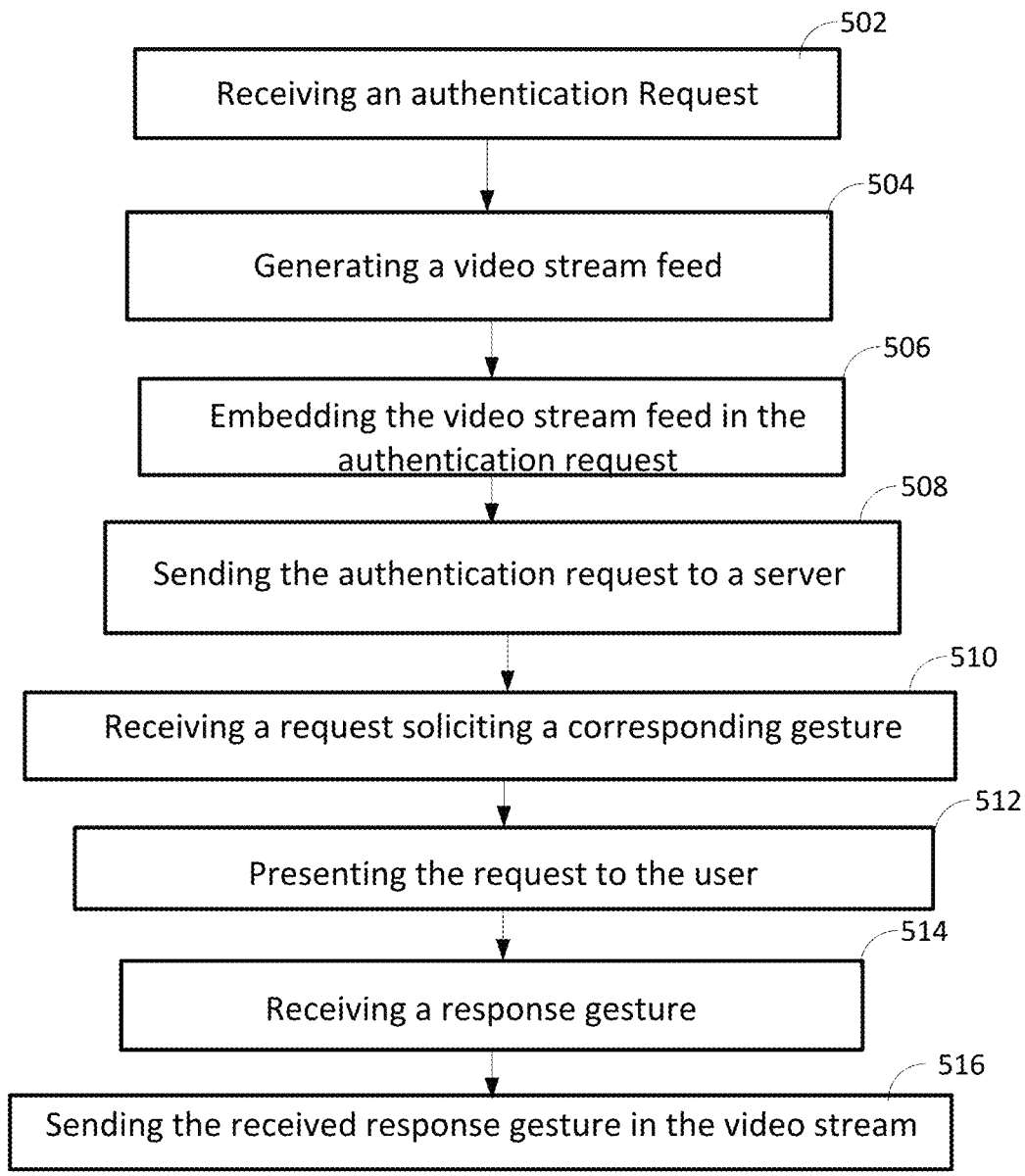
FIG. 5A is a flow chart showing an example method at a user device for authenticating the user according to some implementations.

FIG. 5A is a flow chart showing an example method at a user device for authenticating the user according to some implementations. The user device may receive an authentication request from consumer 202 (502). The user device may include, for example, a smart phone, a mobile computing device, or a desktop computer. The authentication request may attempt to obtain access to an account at a relying party 204, for example, a bank.

A video stream feed may be generated based on input from, for example, a camera device on the user device (504). The camera device may include a web cam, a video camera, or a smart-phone camera.

The generated video stream feed may be embedded in the authentication request (506). The authentication request may then be sent to a server at the relying party 204, such as, for example, the bank (508). As discussed herein, the transmission may selectively transmit video frames according to a video transmission protocol, for example, video codec standards under H.261.

Figure 6A:
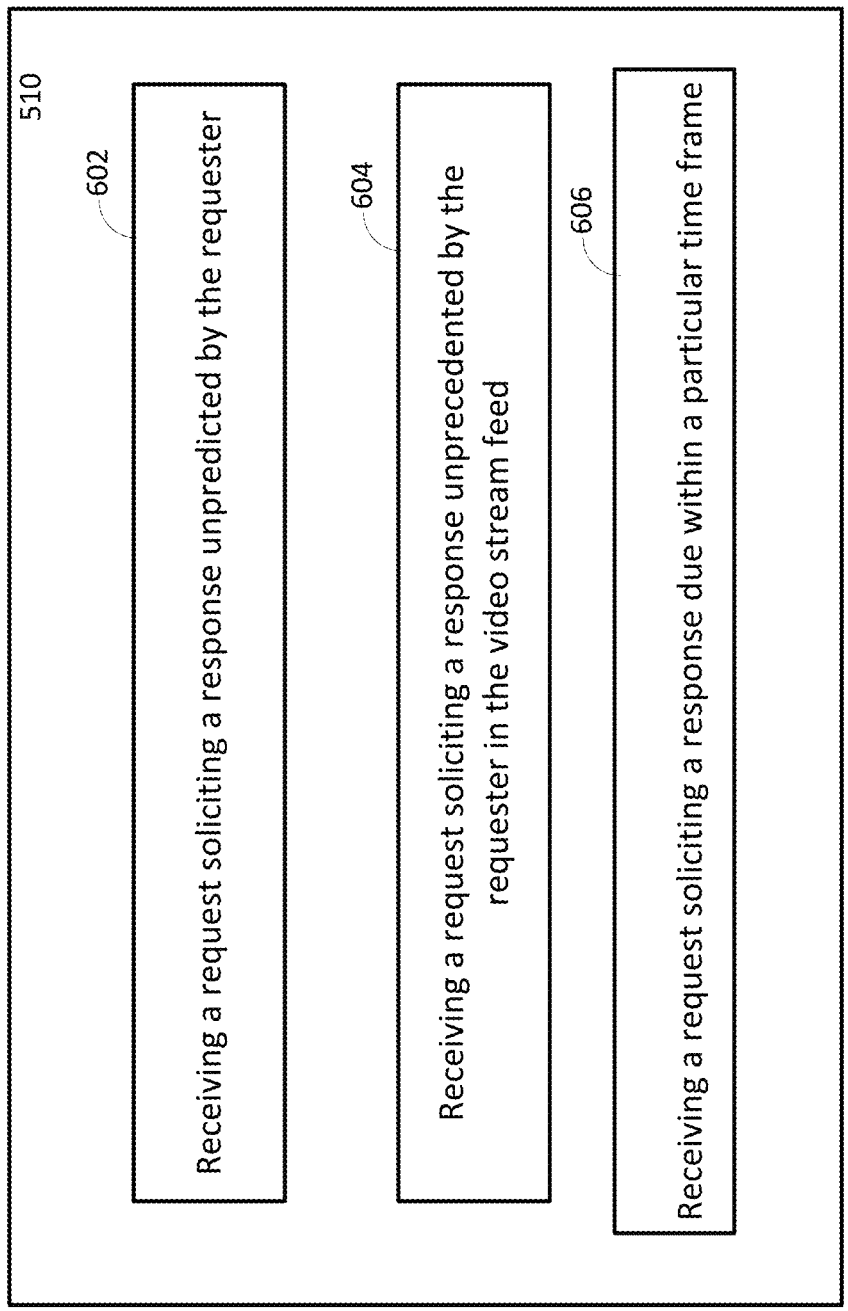
FIG. 6A illustrates an example method at a user device for authenticating the user according to some implementations.
Figure 6B:
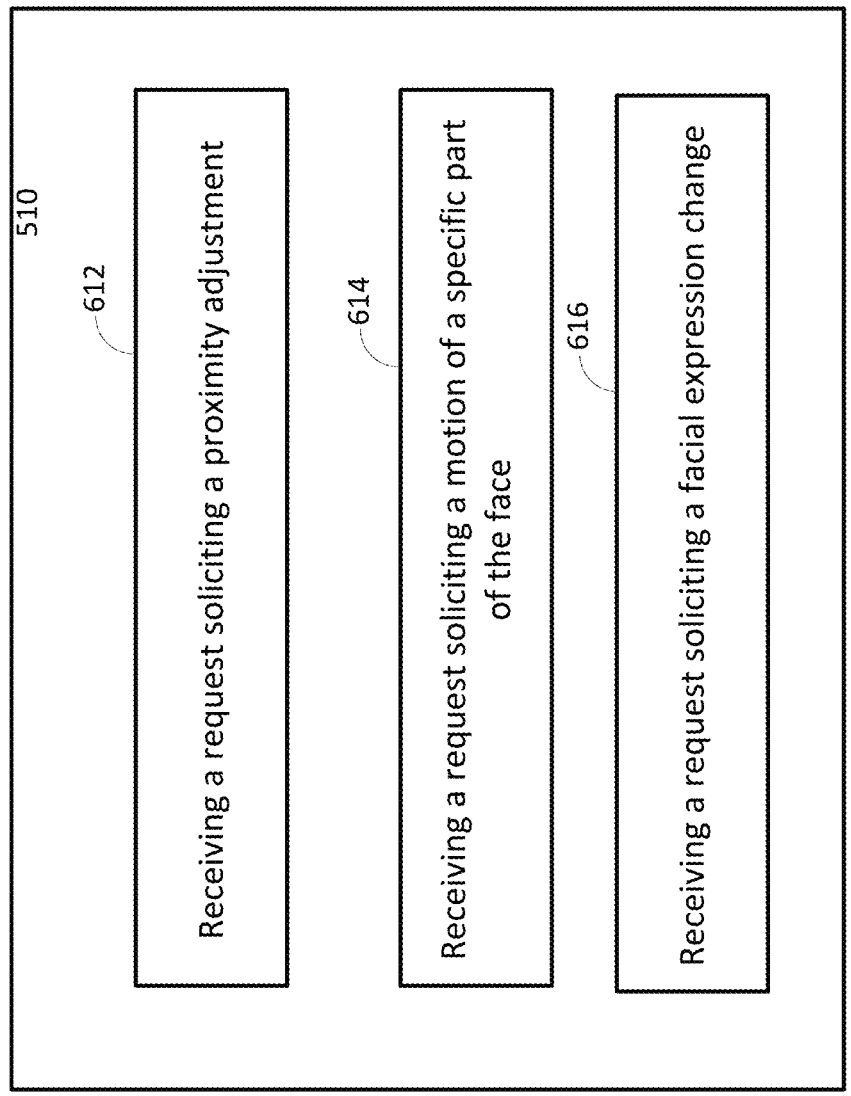
FIG. 6B illustrates another example method at a user device for authentication the user according to some implementations.

As disclosed herein, consumer 202 may log into, or attempt to log into, an account at relying party 204. Consumer 202 may then be redirected to a verified presence service provided by an identity provider 206. The user device may receive a request soliciting consumer 202 to gesture (510). As illustrated in FIG. 6A, the request may solicit a response unpredicted by consumer 202 (602). The request may solicit a response not yet experienced by consumer 202 during the verified presence service (604). The request may also solicit a response be provided within a time window (606). As further illustrated in FIG. 6B, the request may solicit a proximity adjustment (612). For example, the request may ask consumer 202 to get closer to or further away from the camera device. The request may solicit a motion of a specific part of the face, for example, an eye brow, a nose, (614). The request may also solicit a facial expression change (616).

Returning to FIG. 5A, the user device may then present the request to consumer 202 (512). As discussed herein, the request may be presented verbally, textually, or graphically. The request may be presented, for example, on the touch screen of the user device.

The user device may include a camera device, as discussed above. Through the camera device, a response gesture may be received from consumer 202 (514). The received response gesture may be digitized and then embedded in the video stream (516). As discussed herein, the video stream feed may be relayed to the server at identity provider 206.

Figure 5B:
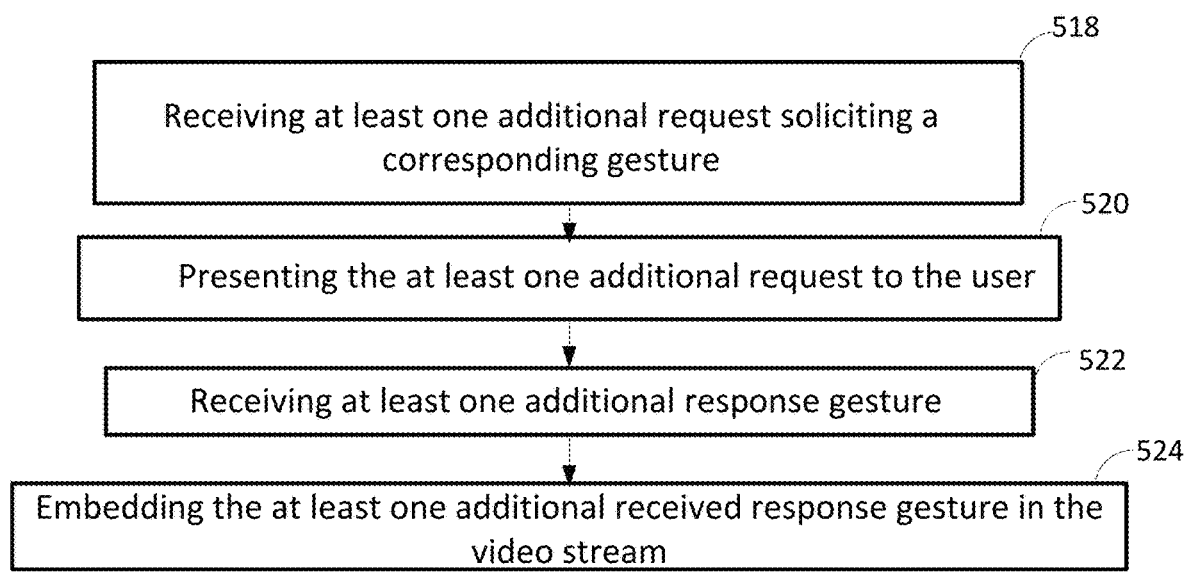
FIG. 5B is a flow chart showing another example method at a user device for authenticating the user according to some implementations.

Consistent with the disclosure herein, user device may receive multiple directives to be presented to consumer 202 to increase the confidence level that a live consumer is attempting to enroll in the service. The user device may receive at least one additional request soliciting a corresponding gesture (518). As illustrated in FIG. 5B, the at least one additional request may be presented to consumer 202 (520), for example, on the same touch screen after the first response gesture has been sent to identity provider 206. In response, at least one additional response gesture may be received at the user device (522), for example, through a smart-phone camera. Thereafter, the at least one additional received gesture response may be embedded in the video stream feed (524). As discussed herein, multiple requests for different and separate response gestures may obviate the ambiguities associated with a single response gesture. For example, when consumer 202 may not be responding to the fullest extent as requested, or when sampling error during video transmission may have missed the frame that contains the exact response gesture, a single response gesture may be insufficient to determine with confidence that consumer 202 is a live person attempting to enroll in the service.

Various implementations of systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (e.g., a CRT (cathode ray tube), LCD (liquid crystal display) monitor, LED (light-emitting diode) or OLED (organic light-emitting diode) monitors) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the disclosure. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. At least one non-transitory computer readable storage device storing instructions that, when executed by at least one processor, cause the at least one processor to perform operations comprising:

transmitting, by a user computing device of a requester and to a computing system of an identity provider, an authentication request to access an account managed by a relying party by (i) establishing a video stream feed between the requester and the computing system of the identity provider, and (ii) generating a first portion of the video stream feed, the first portion of the video stream portraying a face of the requester and operating at a first refresh rate;

receiving a directive from the computing system of the identity provider, the directive soliciting a corresponding gesture so that the requester receives an instruction to transition to the corresponding gesture;

generating a second portion of the video stream feed, the second portion of the video stream portraying a response gesture from the requester reacting to the instruction to perform the corresponding gesture, the second portion of the video stream operating at a second refresh rate that is sufficiently higher than the first refresh rate to include at least one frame that encodes a transition from before the corresponding gesture to the corresponding gesture; and transmitting the second portion of the video stream feed to the computing system of the identity provider such that:

in response to determining that (i) the response gesture matches the corresponding gesture being solicited and (ii) the requester is not yet enrolled at the identity provider, the identity provider establishes a biometric identity for the requester by storing, at the computing system of the identity provider, data encoding the face of the requester, and in response to determining that the response gesture matches the corresponding gesture being solicited, the requester is allowed access to the account at the relying party.

2. The device of claim 1, wherein transmitting the second portion of the video stream feed to the computing system of the identity provider causes a biometric identity for the requester to be established at the computing system of the identity provider.

3. The device of claim 2, wherein transmitting the second portion of the video stream feed causes a biometric identity for the requester to be established at the computing system of the identity provider by storing, at the computing system of the identity provider, data encoding an extracted face of the requester.

4. The device of claim 1, wherein receiving the directive comprises receiving the directive soliciting the corresponding gesture due within a particular time frame after the directive has been received.

5. The device of claim 1, wherein receiving the directive comprises receiving the directive that is presented verbally on the user computing device of the requester.

6. The device of claim 1, wherein receiving the directive comprises receiving the directive that is presented textually on the user computing device of the requester.

7. The device of claim 1, wherein receiving the directive comprises receiving the directive that is presented as at least one graphical icon on the user computing device of the requester.

8. The device of claim 1, further comprising: receiving at least one additional directive soliciting at least one additional response gesture for the requester to perform the at least one additional response gesture.

9. The device of claim 8, wherein soliciting at least one additional response gesture comprises soliciting at least one additional response gesture that is not present in earlier response gestures.

10. The device of claim 1, wherein receiving the directive comprises receiving the directive soliciting a proximity adjustment from the requester.

11. The device of claim 1, wherein receiving the directive comprises receiving the directive soliciting a motion of a specific body part of the requester.

12. The device of claim 1, wherein receiving the directive comprises receiving the directive soliciting a facial expression change from the requester.

13. A mobile computing device, comprising:
one or more processors;
one or more non-transitory media operably connectable to the one or more processors and storing instructions that, when executed, perform operations comprising:
transmitting, from the mobile computing device and to a computing system of an identity provider, an authentication request to access an account managed by a relying party by (i) establishing a video stream feed between a requester and the computing system of the identity provider, and (ii) generating a first portion of the video stream feed, the first portion of the video stream portraying a face of the requester and operating at a first refresh rate;

receiving, at the mobile computing device, a directive from the computing system of the identity provider, the directive soliciting a corresponding gesture so that the requester receives an instruction to transition to the corresponding gesture;

generating a second portion of the video stream feed, the second portion of the video stream portraying a response gesture from the requester reacting to the instruction to perform the corresponding gesture, the second portion of the video stream operating at a second refresh rate that is sufficiently higher than the first refresh rate to include at least one frame that encodes a transition from before the corresponding gesture to the corresponding gesture; and transmitting the second portion of the video stream feed to the identity provider such that:
in response to determining that (i) the response gesture matches the corresponding gesture being solicited and (ii) the requester is not yet enrolled at the identity provider, the computing system of the identity provider establishes a biometric identity for the requester by storing, at the computing system of the identity provider, data encoding the face of the requester, and in response to determining that the response gesture matches the corresponding gesture being solicited, the requester is allowed access to the account at the relying party.

14. The mobile computing device of claim 13, wherein receiving the directive comprises receiving the directive soliciting the corresponding gesture due within a particular time frame after the directive has been received.

15. The mobile computing device of claim 13, wherein receiving the directive comprises receiving the directive that is presented verbally.

16. The mobile computing device of claim 13, wherein receiving the directive comprises receiving the directive that is presented textually.

17. The mobile computing device of claim 13, wherein receiving the directive comprises receiving the directive that is presented as graphical icons on the mobile computing device.

18. The mobile computing device of claim 13, wherein the operations further comprise: receiving at least one additional directive soliciting at least one additional response gesture for the requester to perform the at least one additional response gesture.

19. The mobile computing device of claim 18, wherein soliciting at least one additional response gesture comprises soliciting at least one additional response gesture that is not present in earlier response gestures.

20. The mobile computing device of claim 13, wherein receiving the directive comprises receiving the directive soliciting a proximity adjustment from the requester.

* * * * *